W. R. GREEN.
TIRE CARRIER.
APPLICATION FILED AUG. 13, 1917.
1,349,507.
Patented Aug. 10, 1920.
2 SHEETS—SHEET 1.
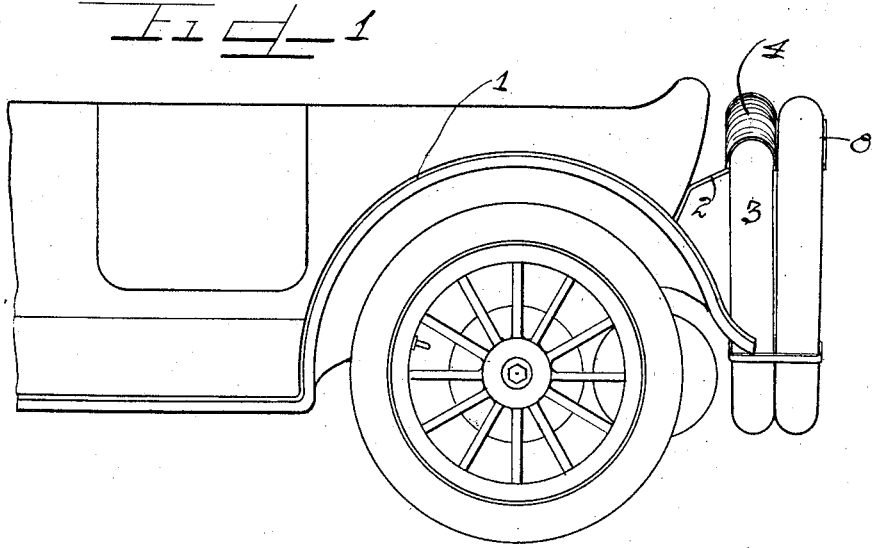
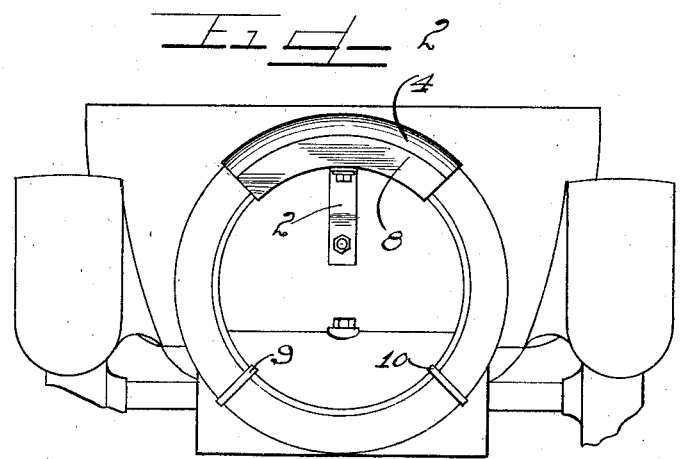
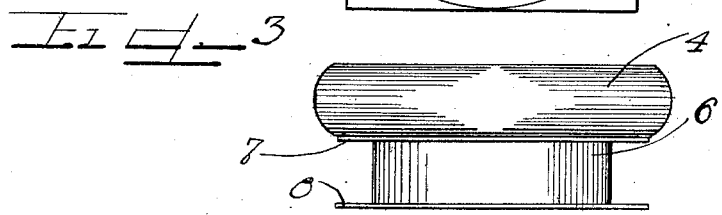
Witnesses
C. H. Peterson
Charles Hill Jr.
Inventor
Walter R. Green.
by Charles Hill
Atty.

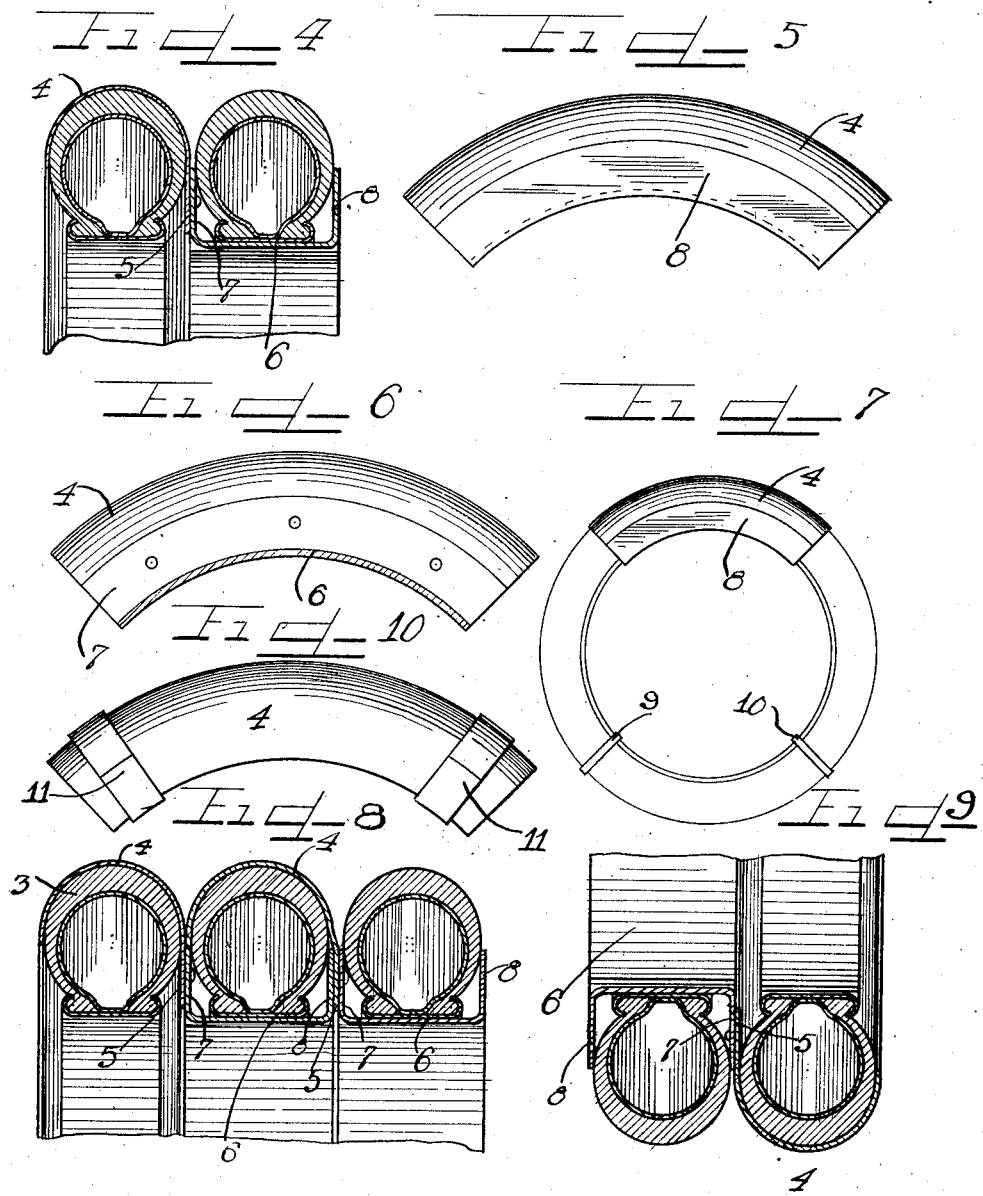

UNITED STATES PATENT OFFICE.

WALTER R. GREEN, OF CHICAGO, ILLINOIS.

TIRE-CARRIER.

1,349,507.   Specification of Letters Patent.   Patented Aug. 10, 1920.

Application filed August 13, 1917. Serial No. 185,927.

*To all whom it may concern:*

Be it known that I, WALTER R. GREEN, a citizen of the United States, and a resident of the city of Chicago, in the county of Cook and State of Illinois, have invented certain new and useful Improvements in Tire-Carriers; and I do hereby declare that the following is a full, clear, and exact description of the same, reference being had to the accompanying drawings, and the numerals of reference marked thereon, which form a part of this specification.

This invention relates to improvements in a tire carrier. Heretofore, much difficulty and annoyance has been occasioned when it is desired to carry more spare casings than the ordinary tire carriers furnished by the manufacturer with the machine, will hold. As a usual rule on the majority of machines, a carrier for one extra tire is provided, and it is often desired to carry two or more spare tires. Heretofore, this necessitated carrying the second or third extra tire on the running board or some other unhandy place, and has caused considerable annoyance and inconvenience.

It is an object of this invention to provide an auxiliary tire carrier for automobiles which is quickly attached when desired to use the same, and quickly detached when not in use.

It is further an object of this invention to provide an auxiliary tire carrier for extra tires which is supported by the tire carrier furnished with the machine when a tire is supported therein.

It is further an object of this invention to provide a device of the class specified in which any number of extra casings and tires may be carried by simply inserting another section or auxiliary carrier.

Other and further important objects of this invention will be apparant form the disclosures in the specification and drawings.

The invention (in a preferred form) is illustrated in the drawings and hereinafter more fully described.

On the drawings:

Figure 1 is a fragmentary side elevation of a car provided with a device embodying my invention.

Fig. 2 is a rear view of a car provided with a tire carrier embodying my invention.

Fig. 3 is a top plan view of a device embodying my invention.

Fig. 4 is a transverse section thereof showing two tires in cross-section.

Fig. 5 is an enlarged side view of a tire carrier embodying this invention.

Fig. 6 is a similar view taken through one of the channel members.

Fig. 7 is a view of the carrier supported on a tire.

Fig. 8 is a sectional view illustrating the use of two auxiliary tire carriers.

Fig. 9 is a sectional view illustrating the carrier secured to the inner periphery at the bottom of a tire and which illustrates another adaptation of the carrier.

Fig. 10 illustrates a modified device embodying this invention.

As shown on the drawings:

1, indicates a part of an automobile which is provided with an ordinary carrier furnished by the manufacturers of which only the upper supporting brace 2, is shown, and a tire 3, is also shown supported by said carrier. The auxiliary carrier embodying my invention comprises a channel member 4, adapted to slip over the tire 3, and to be supported thereby. Said channel member is of sufficient cross-sectional area to snugly fit the casing and has a depending flange 5 to which is secured a channel member 6, to receive another tire or casing therein. Said channel member 6, has sidewalls 7—8, to receive the tire therebetween, and both channel members are annular in shape and of sufficient length to afford the proper bearing and supporting surface.

The device in effect provides oppositely facing channel members secured together one of which is adapted to receive a tire therein, and the other to engage on a tire and support the second tire therefrom. In Fig. 10, the channel member 4 is constructed as before described and secured thereto are clips or brackets 11, adapted to receive the extra tire therein.

While I have shown the channel member 4 as a continuous member of even cross area throughout, still this is not essential, it being necessary only that there be contact at separated points between said supporting and supported tires upon opposite sides of the vertical centers of said tires to prevent transverse and lateral displacement.

The operation is as follows:

When it is desired to carry two extra tires or one more than the number for which the original tire carrier of the car was intended, the auxiliary tire carrier is placed on the tire 3, on the original tire carrier, which provides a supporting channel 6, into which the second tire is placed, as shown in Figs. 1, 2 and 4, and the two tires are then strapped together by straps 9—10. If it is desired to carry a third tire, an auxiliary carrier is inserted on the second tire, as shown in Fig. 8, and the third tire placed in the channel 6. This enables as many tires as desired being carried by these auxiliary tire carriers.

As shown in Fig. 9, the auxiliary carrier, instead of being supported on the top of the outer circumference of the tire, is reversed and placed over the tire and rim on the inner circumference at the bottom, and the second extra tire is placed in the channel 4, and the tires strapped together at the top.

From the device disclosed, it will be seen that the auxiliary carriers may be used to carry the desired number of extra tires, and that they may be used in connection with any carrier or any car, inasmuch as the auxiliary carrier is supported on the tire and is not connected to the original carrier in any way, and does not depend for its use on a specially constructed carrier. The device is therefore adapted for universal use, as an auxiliary tire carrier.

Many modifications may be made and numerous changes may be effected without departing from the principles of this invention, and I therefore do not desire to limit the patent granted otherwise than necessitated by the prior art.

I claim as my invention:

1. A tire carrier, comprising an elongated bracket curved in substantially semi-circular form to fit the tread of a vertically disposed supporting tire upon opposite sides of its vertical center and reversely hooked to engage a supported tire so that the latter tire is suspended therefrom, said members being provided with plate portions intermediate of and at the outer sides of each tire engaging the lateral walls thereof so that the weight of the supported tire cramps the bracket in engagement with the tires and obviates transverse dislocation.

2. In a tire carrier, the combination of a bracket comprising a pair of correspondingly curved elongated members, one of which is transversely-shaped in substantially semi-circular form to engage over the tread of a supporting tire and the other of which is reversely hooked to engage under the inner periphery of a supported tire so that the latter tire is suspended therefrom, said members being provided with plate portions intermediate of and at the outer sides of each tire engaging the lateral walls thereof so that the weight of the supported tire cramps the bracket in engagement with the tires and obviates transverse dislocation.

In testimony whereof I have hereunto subscribed my name in the presence of two subscribing witnesses.

WALTER R. GREEN.

Witnesses:
CHARLES W. HILLS, Jr.,
EARL M. HARDINE.